Feb. 3, 1925.　　　　　　　　　　　　　　　　　　　　　1,525,270
T. L. COURTNEY
SHOCK ABSORBING ROAD WHEEL OF VEHICLES
Filed June 20, 1923

Inventor
Thomas L. Courtney
by W. H. Babcock & Son
Attorneys

Patented Feb. 3, 1925.

1,525,270

UNITED STATES PATENT OFFICE.

THOMAS LEE COURTNEY, OF GARDENVALE, VICTORIA, AUSTRALIA, ASSIGNOR OF TWO-THIRDS TO HUGH KEITH, JR., OF WYCHITELLA, VICTORIA, AUSTRALIA.

SHOCK-ABSORBING ROAD WHEEL OF VEHICLES.

Application filed June 20, 1923. Serial No. 646,542.

*To all whom it may concern:*

Be it known that I, THOMAS LEE COURTNEY, a subject of the King of Great Britain and Ireland, Etc., residing at 43 Begonia Road, Gardenvale, in the State of Victoria, Commonwealth of Australia, have invented certain new and useful Improvements in Shock-Absorbing Road Wheels of Vehicles; and I do hereby declare the following to be a full, clear, and exact description of the invention, such as will enable others skilled in the art to which it appertains to make and use the same.

This invention relates to vehicle road wheels of that class in which connections between the hub and the rim of the wheel absorb a portion or all of any shock which the hub, or rim receives from time to time, as during travel of a motor car fitted with such wheels.

I explain my construction relatively to the accompanying drawings which are not to scale, but I do not limit the invention to minor details illustrated, so far as these may obviously be modified while keeping within the scope of what is hereinafter claimed.

In the drawings Figure 1 is a side elevation, partly sectional, of part of a wheel according to this invention, some parts shown at the upper part of the figure not being illustrated at the lower part (where they also occur in practice) the omission enabling inner parts to be clearly shown.

Figures 3 and 5 show elements spaced apart to clearly illustrate the construction.

Figure 1:
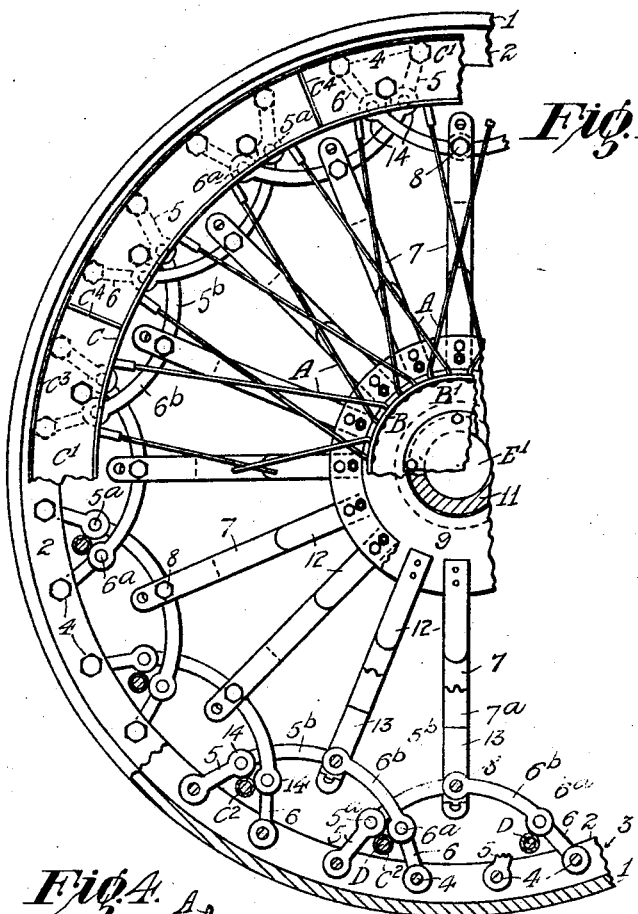

The wheel has any suitable rim periphery 1, engaging which there may be an external tread as a rubber or other suitable tire, not illustrated, the cross sectional form of member 1 being varied to suit such tread. Extending inwardly from rim 1, and shown integral therewith, though they could be removably fitted, are two circular flanges 2 between which is a channel 3.

Connecting the flanges 2, and spaced equidistantly around them are bolts 4 which carry the outer ends of inclined links 5 and of inclined links 6, which by means of transverse pins $5^a$, $6^a$, are jointed to links $5^b$, $6^b$, respectively, which extend towards one another, the inner ends of the links $5^b$, $6^b$ overlapping (see Figure 5) and being each connected to radial spring arms 7, $7^a$ (see Figure 2) by a transverse bolt 8 which carries a spacing sleeve $8^a$ (see Figure 3) which ensures free pivotal movement of the ends of the links.

The springs form pairs, the members of each pair being at one end pivoted close to one another on their bolt 8, and at the other end kept apart as hereinafter explained.

Figure 2:
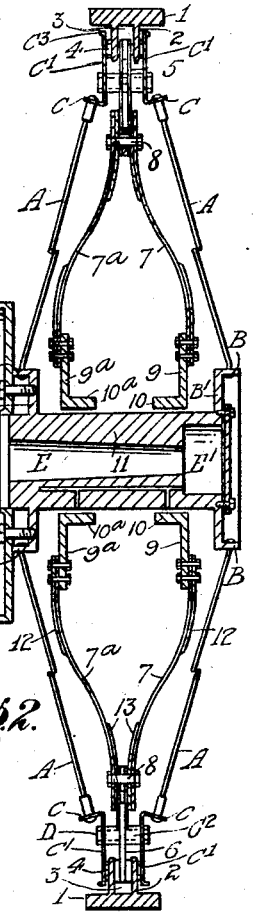
Figure 2 shows a vertical section through a slightly modified form of wheel omitting the clamping rings for the radially inner ends of the leaf springs.
Figure 3:
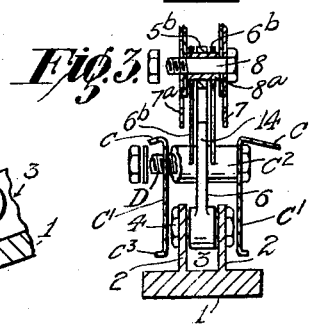
Figure 3 shows part of Figure 2.

The modified form of the invention or wheel embodying the same and illustrated in Figure 2, as to construction and operation is in all respects the same as in the preferred form, except that the clamping rings for the radially inner ends of the leaf springs are omitted.

Figure 4:
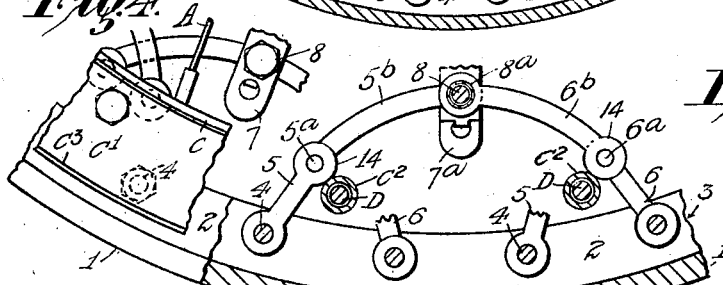
Figure 4 shows (enlarged) part of Figure 1.
Figure 5:
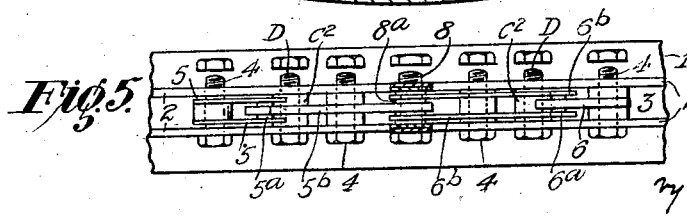
Figure 5 is a plan of part of Figure 4.

In Figure 5, links 5 and $6^b$ are shown in pairs. Link $5^b$ is in each case single and enters the space between a pair of links $6^b$, and between a pair of links 5. Link 6 is in each case single and enters into a space between a pair of links $6^b$. A set of links 5, $5^b$, $6^b$, a pair of links $6^b$. A set of links 5, $5^b$, $6^b$, and 6, taken in that order as seen in Figure 4, forms an arc, and each arc end overlaps an adjoining arc end.

The jointed links 5, $5^b$, and the jointed links 6, $6^b$, have enlarged apertured ends 14, which provide bearing surfaces contacting with ferrules or sleeves $C^2$ which are upon transverse bolts D which connect the wheel rim rings $C^1$ hereinafter referred to.

The wheel spokes A extend from suitable parts shown as flanges B of oppositely located ring like hub members $B^1$, to suitable parts shown as flanges C of the aforesaid wheel rim rings $C^1$, the latter being held apart by the ferrules $C^2$ on the bolts D which pass through the rings $C^1$. When the wheel is free from stresses each sleeve $C^2$ bears upon the ends 14 (which are rounded) of adjacent links as shown in Figure 1. Rings $C^1$ carry any desired strengthening webs $C^4$ (see Figure 1) and these rings are not fixed to, but are on the outer sides of, flanges 2.

When road shocks occur the rings $C^1$, the flanges 2, and other parts will move as explained hereinafter.

Movements of rings $C^1$ relatively to the wheel rim 1 are limited by providing on the rings; flanges C³, so that if an extreme shock is imparted to the wheel the flanges C³ meet the rim and prevent excessive stress occurring on links 5, 6. The leaf or plate springs 7, 7ª are shown curved, and are in pairs, diverging as they extend towards the hub, their inner ends being fastened to flanges 9, 9ª, of respective sleeves 10, 10ª which are similar to and are located opposite one another.

The sleeves encircle the hub 11 inward of spokes A, and are laterally slidable towards and from one another. The spring ends are stiffened by attached helpers 12 near the hub, and attached helpers 13 near the rim. Helpers 12 are on spring outer sides and helpers 13 on spring inner sides. Sleeves 10, 10ª are illustrated as not fitting the hub closely, some free play of these parts in the vertical plane relatively to each other being thus with advantage allowed.

The hub carries the axle in a hole E, and may have a grease chamber E¹, and a brake drum F may be carried by the wheel. In practice when a shock is imparted to the tire of the wheel it will be distributed by means of the described links and springs. Thus when there is a shock to the wheel which causes pressure on bolts D inwardly, pressure is transmitted to those links 5 and 6 which are close to the point of shock; the pressure spreading them farther apart, and thus likewise spreading also the connected links 5ᵇ, 6ᵇ, and moving the corresponding pivot bolts 8, so as to exert pull upon the resilient arms 7, 7ª. The said pulling of the latter produces an inward transverse movement of each sleeve 10, 10ª thus absorbing or largely reducing the shock which otherwise would be more powerfully transmitted to the axle, and thus to the vehicle body.

Such shocks as proceed from the hub 11 towards the wheel rim, and tend to move bolts D out of normal positions, will obviously also be absorbed or reduced by the functioning of the parts located between the sleeves 10, 10ª and said bolts. When stresses which caused sleeves 10, 10ª to move towards one another are reduced, these and other connected parts which left their normal positions return to normal under the influence of the springs 7, 7ª.

Owing to suspension of wheel members within the rim 1 and as shocks received by the wheel are absorbed as aforesaid as described, I term my wheel one of compensating suspension shock absorbing type.

I claim:

1. A shock absorbing wheel, having a rim, outer links pivotally connected to the rim, inner links pivoted to the outer links and extending in pairs inwardly to pivotal connections, radial springs extending from each latter connection towards the hub and diverging as they approach the latter, each spring inner end being connected to a sleeve which loosely encircles the hub, transverse means which bear against the inner ends of the outer links, rings between which the said means extend, and means which connect the said rings to the hub.

2. A shock absorbing wheel, having a rim, outer links pivotally connected to the rim, inner links pivoted to the outer links, and extending in pairs inwardly to pivotal connections, curved radial springs extending from each latter connection towards the hub and diverging as they approach the latter, each spring end having a helper, each spring inner end being connected to a sleeve which loosely encircles the hub.

3. A shock absorbing wheel, having a rim, outer links pivotally connected to the rim, inner links pivoted to the outer links, and extending in pairs inwardly to connections where they overlap and have pivotal bolts passing through them, radial springs extending from each said bolt towards the hub and diverging as they approach the latter, each spring inner end being connected to a sleeve which loosely encircles the hub, transverse means which bear against the inner ends of the outer links, rings between which the said transverse means extend, and means which connect the said rings to the wheel hub, the outer links including single links and parallel pairs, the inner links including single links and parallel pairs, the ends of the single links extending between ends of adjacent parallel pairs.

4. A shock absorbing wheel, having a rim and a hub, and loosely encircling the hub oppositely set and laterally slidable sleeves, each sleeve having a series of springs connected to it, pairs of the springs being opposite one another and outwardly converging to a pivotal connection from which pivoted links extend outwardy to the wheel rim.

5. A shock absorbing wheel, having pivoted within its rim outer links which extend towards one another, and pivoted to each such link an inner link, the inner links extending towards and overlapping one another, the said links forming arcs, each arc end overlapping the end of an adjoining arc, the inner links being pivoted at each said overlap to means adapted to receive shocks from and transmit shocks to sleeves loosely encircling the hub.

6. A shock absorbing wheel, having pivoted within its rim outer links which extend towards one another, and pivoted to each such link an inner link, the inner links extending towards and overlapping one another, series of the links forming arcs, each arc end overlapping the end of an adjoining arc, the inner links being pivoted at each said overlap to means adapted to receive shocks from and transmit shocks to sleeves loosely encircling the hub, the said means including pairs of radial springs which diverge and are connected to the said sleeves, the hub having connections to rings supported within the rim.

7. A shock absorbing wheel, having pivoted within its rim outer links which extend towards one another, and pivoted to each such link an inner link, the inner links extending towards and overlapping one another, series of the links forming arcs, each arc end overlapping the end of an adjoining arc, the inner links being pivoted at each said overlap to means adapted to receive shocks from and transmit shocks to members loosely encircling the hub, the said means including pairs of diverging radial leaf springs which are connected to the said members which loosely encircle the hub, the hub having connections to rings supported within the rim, the aforesaid links having rounded ends against which bear ferrules on members connecting the said rings.

In witness whereof I have hereunto set my hand.

THOMAS LEE COURTNEY.